United States Statutory Invention Registration [19]

[11] Reg. Number: H850

Feldman [43] Published: Nov. 6, 1990

[54] SINGLE OPTICAL FIBER SLAVE/MASTER TRANSMISION SYSTEM

[76] Inventor: Nathan W. Feldman, 910 Van Court Ave., Elberon, N.J. 07740

[21] Appl. No.: 277,574

[22] Filed: Nov. 25, 1988

[51] Int. Cl.[5] ..... G02F 1/00

[52] U.S. Cl. ..... 455/605; 455/610; 455/611; 455/612; 455/617; 455/618; 455/619

[58] Field of Search ..... 455/600, 609, 605, 606, 455/607, 609, 611, 612, 610, 613, 617, 618, 619; 370/3

[56] References Cited

FOREIGN PATENT DOCUMENTS 1429875 3/1976 United Kingdom ..... 455/605
8505530 12/1985 World Int. Prop. O. ..... 455/60
8702531 4/1987 World Int. Prop. O. ..... 455/605

*Primary Examiner*—Thomas H. Tarcza
*Assistant Examiner*—Linda J. Wallace
*Attorney, Agent, or Firm*—Michael Zelenka; Robert A. Maikis

[57] ABSTRACT

A master/slave opto-electrical telephone communication system utilizes a single optical fiber line to transmit out to the subordinate or slave unit from the superior or master unit two light energy carrier waves of different wavelengths, one being modulated and the other unmodulated. At the slave station, the modulated wave is demodulated and translated into sensible signals and the unmodulated wave is modulated and retransmitted to the master station where it is demodulated and translated into sensible indicia.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SINGLE OPTICAL FIBER SLAVE/MASTER TRANSMISION SYSTEM

The invention described herein may be manufactured, used, and licensed by or for the Government of the United States of America for governmental purposes without the payment to me of an royalties thereon.

BACKGROUND OF THE INVENTION

This invention relates to communication by means of optical fibers, and, more particularly, to a novel optical fiber master/slave transmission system to provide main traffic or trunking connections from higher echelon units such as central telephone communications offices to lower echelon units such as switchboards and/or substations. The invention utilizes a single optical fiber connecting means for transmission in both directions through the utilization of wavelength division multiplexing to achieve separation of traffic in the two directions.

The advantages of communicating by means of modulated light transmitted through optical fibers are well known and the techniques of optical fiber transmission have contributed significantly to the advance in telephonic communications. An optical fiber telephone communication system, for example, exhibits a lower attenuation than a comparable system which transmits modulated electrical signals over a wire or cable system, and hence fewer repeaters or booster type units in the lines are required with an optical system than with the predecessor wire systems. Also, optical systems have been shown clearly to have significant security advantages which make them highly desirable in military communications applications. Optical fibers are extremely difficult to tap into in order to discern messages being carried, and since they contain no metal and carry no electrical current, they cannot be detected by such things as metal detectors or radar. In addition, and of great significance to military personnel in the field, is that optical fiber systems and optical telephones and related equipment can be made entirely of lightweight inexpensive plastic materials. Optical systems are not subject to electrical interference caused by such things as atmospheric static, sun spots, or the electromagnetic pulses due to nuclear explosions or to jamming signals.

While optical communication systems of relatively basic and simple sorts have been known down through the ages, witness for instance historically, smoke signals, semaphors used in military and similar communications, illuminated symbols, photo phones and transmission of intelligence by light emitting diodes it has only been relatively recently that the development of thin, lightweight optical fibers and the development of light generators capable of producing laser beams that the practical applications of optical fiber communication such as is involved in this invention, have developed to a useful and practical state in the art. Known fiber optic communications systems usually utilize the optical fiber as the transmission medium only, with the terminal equipment at either end of the fiber optic link being installed as conventional electrical or electronic telephonic equipment, e.g., electrical telephones, teletypes, etc. Such systems require electro-optic interface units at each end of the fiber optic link in order to provide for translation of the optical signals into the conventional electrical signals utilized by known and conventionally available equipment.

In my co-pending U.S. application Ser. No. 856,859, filed May 21, 1986 as a File Wrapper Continuation of my earlier U.S. application Ser. No. 647,767 bearing the same title and filed Sept. 6, 1984, there is disclosed a hybrid telephone system comprising a plurality of optical telephones and a plurality of electrical telephones all connected to a conventional central office. In that invention disclosure, the optical telephones are taught to be provided with opto-electrical interface units colocated with the central office for converting optical signals received from the optical telephones to electrical telephone signals and, conversely, for converting electrical telephone signals from the central office signals which are received to optical signals for transmission to the optical telephones. This application is presently on appeal in the United States Patent and Trademark Office before the Board of Appeals, the latest official paper being the Examiner's answer dated Aug. 7, 1987. The teaching in that application is incorporated herein by reference, since the basic details of fiber optic telephonic communication working in practical consort cooperatively with electrical or electronic telephonic communications systems are explained in that application to the extent that the teaching there is considered to be classical and the application to be omnibus and/or bellwether in nature.

In earlier techniques in the art involving optical fiber telephone communications, the optical telephones disclosed utilize two or more optical fibers for communicating with a central office and/or with each or with a switchboard. The improvement comprehended by my said earlier invention involved the all optical telephone utilization of a single optical fiber capable of using two different wavelengths for two voice or traffic signals. Such wavelength multiplexing prevents cross-talk caused by reflections such as occurred with prior art telephone systems known up to that time.

SUMMARY OF THE INVENTION

The present invention comprises a system which provides the necessary and important means to provide for trunking or linking function from a higher echelon or major central office to a lower echelon, such as a switchboard for example, in the overall communications system utilizing fiber optic connecting fibers, a single optical fiber in each instance, to replace heretofore used normal twin pipe coaxial cable. The benefits of using the fiber optic link are that savings can be effected in weight, bulk, and power consumption. If the lower echelon unit is a military telephone switchboard, where low weight and maximum portability and reliability are important, then the elimination of power-consuming weighty portions which would ordinarily have to be carried or attached to or incorporated in the lower echelon communications equipment, a switchboard or the like for example, could be significantly reduced. Further, in accordance with my invention, the lower echelon unit could be made into a semi passive terminal which could further reduce complexity and power consumption. This effect is achieved by providing most if not all of the heavier light generating and optical audio translating units of whatever type required all at the central station or higher echelon unit where frugality with respect to weight, bulk, power consumption, etc. is not that quite essential.

For convenience in the ensuing description, the higher echelon unit is referred to as the master unit and the lower echelon unit, a switchboard or whatever, is referred to as the slave unit.

Towards furthering the state of the art, then, my invention proposes the use of a single optical fiber for transmission in both directions between a master and a slave unit, and wavelength division multiplexing to achieve separation of the traffic in two directions. The optical carriers needed for the total service are generated in the higher echelon or master unit end of the system where frugalities with regard to weight, power consumption, and the like type losses which must be suffered are not quite as critical as they would be in a lightweight slave or field unit switchboard.

I have thus developed my invention with the principal objective of furnishing a system for trunking between a master and a slave unit, replacing conventional two-pipe metal communication transmission wires, related conduits, etc. with a single optical fiber.

Another object of my invention is to provide for utilization of the single optical fiber in both directions of transmission and at multiplexed and separated wavelengths, both for the separation of communications signals, and for the separation of operating signals required by the system.

A further and important object of my invention is to provide a simple, economically installed, easily maintained, and readily replaceable system of fiber optics communications for applications where ready replacement under field conditions is essential.

A still further object and important object of my invention with regard to military utilization is the facility and mobility of picking up and moving the slave or lower echelon unit in the field or at the outer remote end of the trunk line. In this respect, the fiber optic single link between the master station and the slave station can be readily disposed of, readily retrieved, or even abandoned if the situation requires the unit picked up and moved to a new location, and a new trunk line optical fiber readily connected between the two echelons.

These and other important objects and features of my invention will become the more readily apparent in the light of the ensuing detailed description and the drawings, wherein:

DRAWINGS

Figure 4:
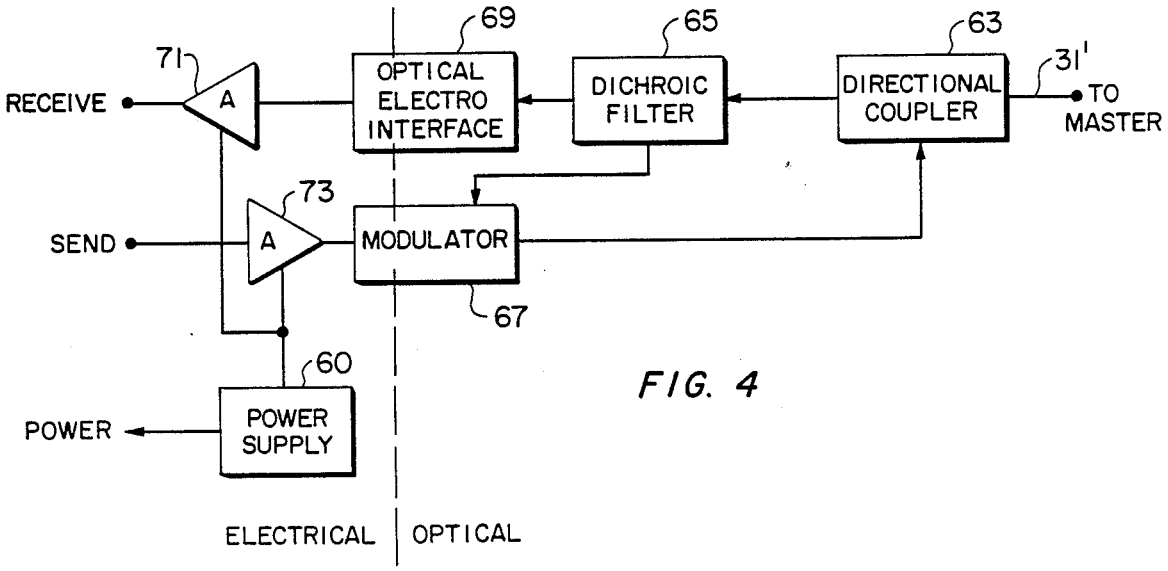

FIG. 4 is a further alternative arrangement of apparatus according to my invention, showing, in block diagram form another version of the arrangement between the master interface and slave interface connections; and FIG. 5 is a block diagram showing the overall and total arrangement of a trunk system utilizing single optical fiber links between the master and slave units of the system in accordance with my invention.

In general, the invention may be accurately described and defined as an optical telephone communication system of apparatus which comprises, in combination, a master station, a slave station, a single optical fiber link connecting the first or master station and the second or slave station, first and second optical energy carrier wave generating means, first modulation means to modulate one of the generated carrier waves, the first carrier wave for example, directional coupler means arranged and adapted to combine the modulated carrier wave and the unmodulated carrier wave which have been generated at different light wavelengths by the first and second optical energy carrier wave generating means, combine these waves and send them simultaneously on the single optical fiber link to the slave station where the incoming signal at that point passes through a third directional coupler means and a dichroic filter means. The dichroic filter means divides or splits the incoming signal into the modulated wave which is sent to a detector and the unmodulated wave is sent to a modulating device. The modulated wave at the slave station is translated into sensible indicia and the unmodulated wave is modulated at the slave station according to transmission data requirements and retransmitted back over the same single link optical fiber to the master station where it impacts on a second directional coupler means located there which in turn sends the second modulated wave to a detector means at the master station wherein it is translated into sensible indicia.

Figure 1:
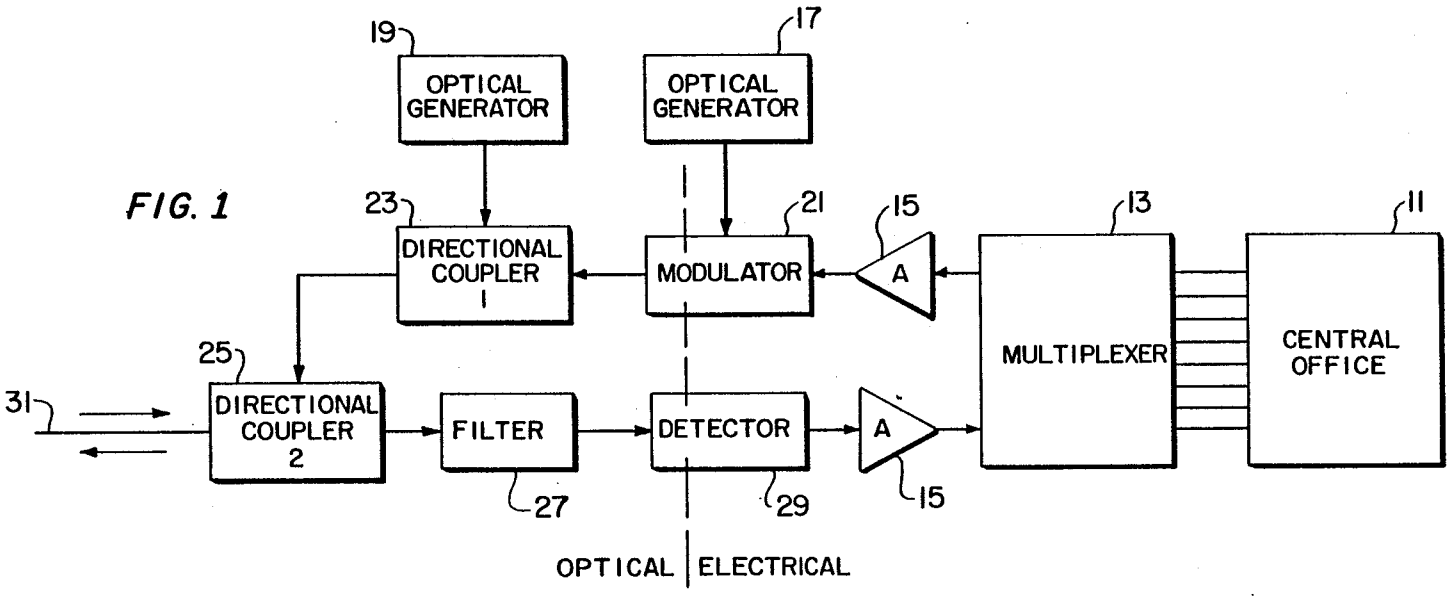
FIG. 1 is a schematic diagram of the master end of the transmission system which would be located at the higher echelon.

FIG. 1 of the drawings shows an arrangement of apparatus components at a master end of a system according to my invention. The right hand side of the drawing shows multiplexing means and a central office block of conventional type and wherein optical signals received from the apparatus arrangement at the left side of the drawing could and would be translated into electrical signals for conventional handling. Conversely, electrical signals from the central office and the multiplexing unit shown at the right hand side of drawing FIG. 1, would be imposed upon the optical or left hand side of the drawing arrangement through opto-electrical converters in the multiplexing unit. In the apparatus arrangement shown in FIG. 1, a central office designated generally as 11 is shown connected by conventional multi trunk lines or connection circuits to a multiplexing unit 13. The multiplexing unit, to the extent required, would, in normal practice, contain all of the necessary opto-electrical interface units required to effect translation between the optical and the electrical modes of transmission.

Amplifier means 15, are shown in the circuits between the multiplexer unit 13 and the apparatus arrangement at the left side of the drawing, that is to say, the optical apparatus arrangement comprised in my invention. Optical carrier wave generators 17, 19 are shown disposed in FIG. 1, with generator 17 connected to a modulator 21. A modulated wave from modulator 21 and an unmodulated wave from optical generator 19, generated at different light wavelengths, are combined in a directional coupler 23. The combined wave from directional coupler 23 is communicated to directional coupler 25 from which it is transmitted on optical fiber 31 out to the slave station.

Figure 2:
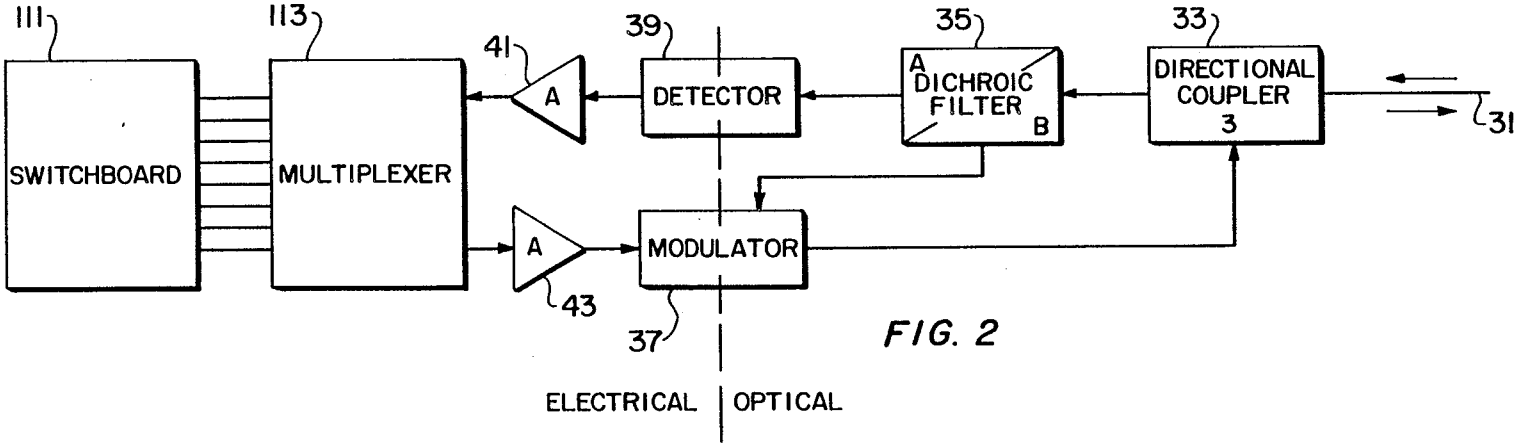
FIG. 2 is a schematic diagram showing the slave or lower echelon end of the transmission system according to the invention.

A diagram of a typical slave station according to my invention is shown in FIG. 2. A switchboard 111 is shown connected to a multiplexer unit 113 in much the same manner and towards serving the same purpose as the central office 11 and multiplexer 13 do in FIG. 1 of the drawing as hereinabove described.

With a beginning orientation at the right hand side of FIG. 2 of the drawing, the optical fiber 31 is shown making an incoming connection to the slave station directional coupler 33, passing through the directional coupler 33 and into dichroic filter 35. Dichroic filter 35 separates the two incoming waves and sends the modulated wave to a detector 39 wherein the modulated wave is translated into sensible indicia, and sent on to the multiplexer through a suitable amplifier 41.

The unmodulated wave separated in the dichroic filter 35 is transmitted to modulator 37. In modulator 37 at the slave station, transmission information is sent through multiplexer 113 and a suitable amplifier 43 into the modulator for modulation of the second or heretofore unmodulated light energy carrier wave which was sent in from the master station and separated out in dichroic filter 35. The now modulated wave which arrived at the slave station unmodulated is sent back through directional coupler 33 from modulator 37 and into and through optical fiber 31 for transmission back to the master station, thus effecting the completion of the two-way communication link.

Referring back now to FIG. 1 of the drawings, the second and now modulated carrier wave retransmitted back from the slave station arrives at the master station location, feeds through directional filter 25, through a filter 27 and into detector 29. The purpose of the filter 27 is to allow only the wavelength frequency of the second generated optical energy wave produced in optical generator 19 and avoid the imposition of the other optical wave which is initially modulated at the master station. The return modulated carrier wave is transformed into sensible indicia in detector 29, and fed through an amplifier 15 into the multiplexer unit and any included optical-electro interfaces, thence through conventional connections into the central office for transmission and/or dissemination through the conventional telephone system which may be connected thereto.

It should be noted here that the functions of directional coupler 23 and directional coupler 25 may be advantageously and conveniently combined into a single appropriate directional coupler unit without seriously or in any other way affecting the operation of my invention.

Figure 3:
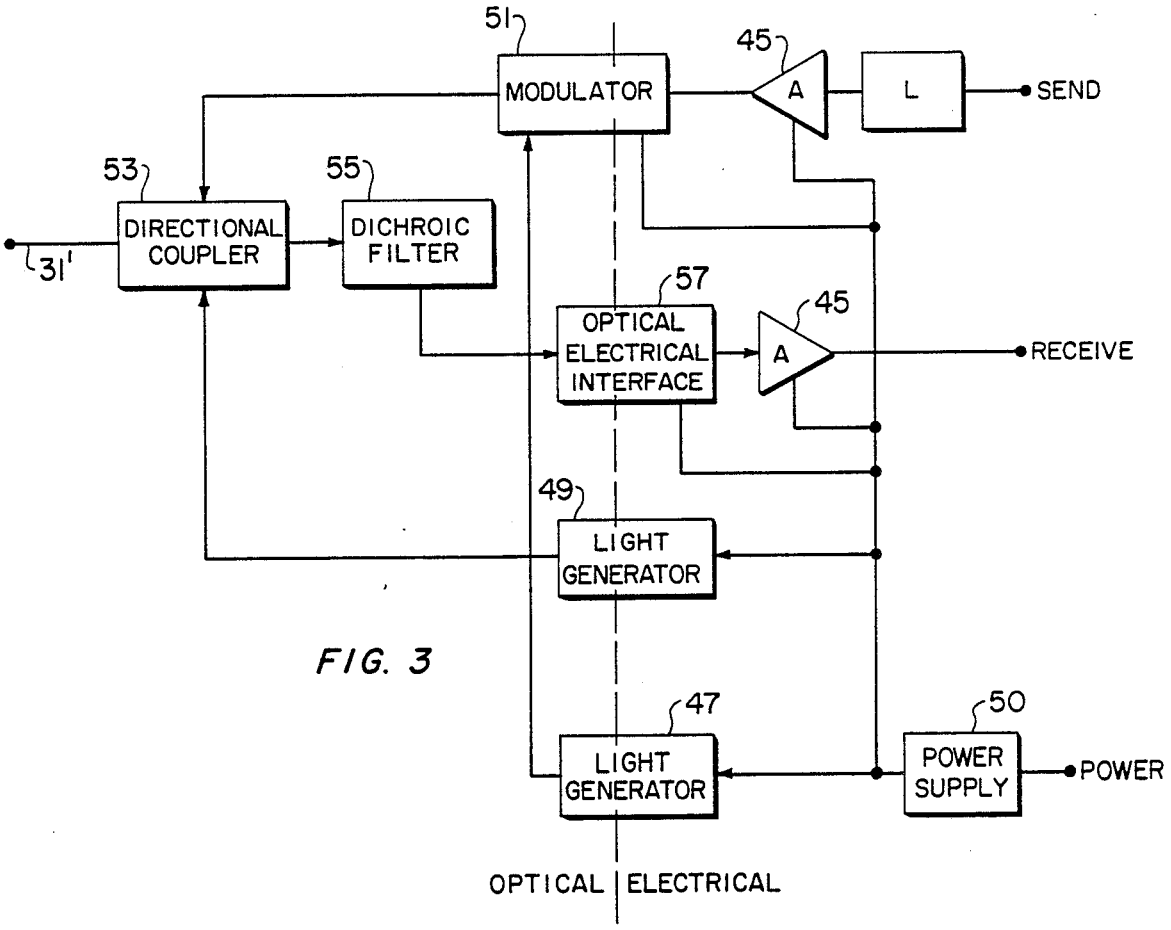
FIG. 3 is a block diagram showing an alternative arrangement of apparatus according to my invention showing the relative connection between the master interface and the slave interface respectively.

FIGS. 3 and 4 of the drawings show alternative arrangements for the master and slave units of optical fiber equipment arrangements according to my invention.

FIG. 3 is a block diagram of a master interface of such alternative arrangement showing a power supply 50 providing the necessary power for carrier wave energy light generators 47 and 49. The optical energy carrier wave generated in 47 is fed into modulator 51 wherein it is modulated from intelligence transmitted from the "send" arm of the arrangement through suitable amplifier 45 and then on into directional coupler 53. A limiter 50 may be advantageously included in the circuit shown in FIG. 3 to restrain input signals from exceeding the capability of the system. The light energy carrier wave generated, at a different wavelength, in generator 49 is fed therefrom directly into directional coupler 53, wherein the modulated and unmodulated waves are transmitted out over optical fiber 31'.

FIG. 4 shows a block diagram of the slave end of the alternative system, wherein signal input arriving at the slave terminal through optical fiber 31 is fed into directional coupler 63. The incoming wave passes through directional coupler 63 into dichroic filter 65, wherein it is separated into its modulated wave which is in turn fed for translation into sensible indicia through optical electro interface 69 and amplifier 71 into a suitable receiving circuit, and the unmodulated wave arriving on optical fiber 31' is passed from dichroic filter into modulator 67 wherein it is modulated by a signal to be sent which arrives from a sending circuit at the station, is fed through a suitable amplifier 73 and into the electro-optical interface component of the modulator 67. The now modulated second carrier wave is fed back through directional coupler 63 and to the master station through optical fiber 31'.

Referring back now to block diagram 3 showing the master station block diagram, the returned modulated signal passes through directional coupler 53 upon its arrival at the master station, proceeds through a dichroic filter 55 and on into optical electrical interface 57 whence it proceeds through amplifier 45 into any suitable receiving circuit.

The electrical power for the equipment shown in FIG. 4 is provided by power supply 60.

EXAMPLE

A working embodiment of my invention may be constructed in accordance with the schematic diagrams presented in FIGS. 1 and 2 of the drawing and utilizing the following commercially available equipment connected as shown:

The directional couplers 19, 25, and 33, are available from the NEC Electronics Co., Inc., catalog #OD-8601.

Dichroic filters such as dichroic filter 35 and multiplexers 113 and 13 are also available from the NEC Electronics Co., Inc., OD-8678. Opto-electrical converters or photo diodes as they are commonly known are commercially available from NEC Electronics Co., catalog #OD-8756.

Modulators for the electro-optic function such as shown in components 21 and 37, are available from Laser Metrics Co. and or Displayteck Co. available from General Fiber Optics Inc., catalog #81-0400. It should be noted that a PIN type photo diode can also be used for the opto-electrical converter application in the invention.

Light generators 17 and 19, known as laser diode generators are available from M/A Space COM Diode Inc.

Here it should be noted that the optical light wave generators 17, 19 can customarily be used to furnish light wave generating sources for more than one type system circuit as shown and can, indeed, be utilized to provide light energy for an entire complex of circuits according to my invention.

Even components such as switchboards, central office equipment, limiters, and the like are well within the ken of persons familiar with the art and also such persons will be knowledgeable as to their availability and whereabouts in the market place.

With illustrative or types of the components described hereinabove, a complete system according to my invention can be connected in accordance with the schematic and/or wiring diagrams of FIGS. 1 and 2 of the drawing. In the utilization of the apparatus arrangement in accordance with my invention the complete separation of wavelengths has been obtained and sensible transmission can be readily transmitted and received in both directions simultaneously.

Other alternative embodiments of my invention will, in the light of the foregoing disclosure, undoubtedly occur to persons who are familiar with the telephonic and the opto-electrical communication arts. It is intended therefore that the foregoing description be considered as illustrative only and it should not be construed in any limiting sense, it being my intention to define and limit my invention in accordance with the appended claims.

What is claimed is:

1. An optical telephone communication apparatus system comprising, in combination;

a first station;

a second station which is subordinate in said system to said first station;

a single optical fiber connecting said first station and said second station;

first optical energy carrier wave generating mans;

second optical energy carrier wave generating means;

first modulation means to modulate an optical energy carrier wave generated by said first optical energy carrier wave generating means;

first directional coupler means adapted to combine a modulated carrier wave from said first generating means and an unmodulated carrier wave from said second generating means;

second directional coupler means in circuit with said first directional coupler means and said single optical fiber, adapted to transmit a combined modulated carrier wave and an unmodulated carrier wave from said first directional coupler means, through said single optical fiber, towards and to said second station;

third directional coupler means in circuit with the second station end of said single optical fiber;

dichroic filter means in circuit with said third directional coupler means, adapted to separate a modulated optical energy carrier wave and an unmodulated optical energy carrier wave received from said optical fiber;

first detector means in circuit with said dichroic filter means adapted to process the modulated carrier wave from said dichroic filter means into sensible indicia;

second modulation means in circuit with said dichroic filter means and said third directional coupler means, adapted to modulate the unmodulated carrier wave from said dichroic filter means and transmit a return modulated carrier wave to and through said third directional coupler means and through said single optical fiber, towards and to said second directional coupler means at said first station; and second detector means in circuit with said second directional coupler means at the first station end of said single optical fiber adapted to process the return modulated carrier wave into sensible indicia.

2. An optical telephone communication apparatus system according to claim 1 wherein;

said first optical energy carrier wave generating means, said second optical energy carrier wave generating means, said first modulation means, said first directional coupler means, and said second directional coupler means are all arranged and disposed in said first station.

3. Apparatus according to claim 1 wherein said first directional coupler means and said second directional coupler means are comprised in a unitary directional coupler device.

4. Apparatus according to claim 2 wherein said first directional coupler means and said second directional coupler means are comprised in a unitary device.

5. Apparatus according to claim 1 in combination with multiplexing means connected in circuit to control communications traffic on said single optical fiber.

6. Apparatus according to claim 1 in combination with opto-electrical interface means at at least one of said first station and second station, arranged and disposed to effect the translation of optical signals to electrical signals and electrical signals to optical signals in said communication system.

7. A method of two-way optical communications between a master station and a slave station comprising, in combination, the steps of:

generating a first optical carrier wave and a second optical carrier wave at said master station;

modulating the first optical carrier wave with a communications signal to be transmitted;

coupling the modulated carrier and the second carrier wave into a combined wave;

transmitting said combined wave over a single optical fiber connection between said master station and said slave station;

separating the modulated carrier wave and the second carrier wave at said slave station;

translating the modulated carrier wave into sensible indicia at said slave station;

modulating said second carrier wave at said slave station;

transmitting back said now modulated second carrier wave on said single optical fiber link between said slave station and said master station; and translating said modulated second carrier wave into sensible indicia at said master station.

* * * * *